United States Patent
Lange et al.

(10) Patent No.: US 6,288,467 B1
(45) Date of Patent: Sep. 11, 2001

(54) ROTOR FOR AN ELECTRIC MACHINE, SPECIALLY A TRANSVERSAL FLOW MACHINE

(75) Inventors: Andreas Lange, Zang; Uwe Muhlberger, Heidenheim, both of (DE)

(73) Assignee: Voith Turbo GmbH & Co., KG, Heidenheim (DE)

( * ) Notice: Subject to any disclaimer, the term of this patent is extended or adjusted under 35 U.S.C. 154(b) by 0 days.

(21) Appl. No.: 09/402,807
(22) PCT Filed: Mar. 13, 1998
(86) PCT No.: PCT/EP98/01463
   § 371 Date: Jan. 5, 2000
   § 102(e) Date: Jan. 5, 2000
(87) PCT Pub. No.: WO98/47214
   PCT Pub. Date: Oct. 22, 1998

(30) Foreign Application Priority Data
Apr. 11, 1997 (DE) ................................ 197 15 019

(51) Int. Cl.⁷ ................. H02K 1/27; H02K 1/04
(52) U.S. Cl. ............... 310/156.58; 310/156.02; 310/156.45
(58) Field of Search ................ 310/156, 261–266, 310/216, 217, 218

(56) References Cited

U.S. PATENT DOCUMENTS

| | | | |
|---|---|---|---|
| 5,051,641 | * 9/1991 | Weh | 310/163 |
| 5,633,551 | * 5/1997 | Weh | 310/266 |
| 5,773,910 | * 6/1998 | Lange | 310/266 |

FOREIGN PATENT DOCUMENTS

| | | |
|---|---|---|
| 41 38 014 | * 2/1993 | (DE) . |
| 43 02 807 | * 8/1994 | (DE) . |
| 196 10 754 | * 3/1997 | (DE) . |
| 0 642 204 | * 3/1995 | (EP) . |
| 0 712 199 | * 5/1996 | (EP) . |
| 0 779 696 | * 6/1997 | (EP) . |
| 2 606 951 | * 5/1988 | (FR) . |

* cited by examiner

*Primary Examiner*—Karl Tamai
(74) *Attorney, Agent, or Firm*—Marshall, Gerstein & Borun

(57) ABSTRACT

The invention relates to a rotor for an electrical machine, specially a transversal flow machine, having at least one pole structure. The pole structure encompasses two adjacent rows of magnet arrangements which are alternatively magnetized in the peripheral direction. The rows are separated by an intermediate layer made of magnetically and electrically non-conductive material (intermediate ring). The magnet arrangements having of inter-lying collector and soft iron elements. The magnet arrangements interlock with adjacent collector or soft iron elements in the peripheral direction. The collector or soft magnet elements are at least partially provided with an insulating layer. The invention is characterized in that at least one of the collector or soft iron elements that is adjacent in the periphery of the magnet arrangement is devoid of a radially external stop providing at least indirect support for the magnet arrangements in radial direction.

14 Claims, 3 Drawing Sheets

ROTOR FOR AN ELECTRIC MACHINE, SPECIALLY A TRANSVERSAL FLOW MACHINE

FIELD OF THE INVENTION

The invention concerns a rotor for an electric machine, especially a transversal machine.

BACKGROUND OF THE INVENTION

Rotors for electric machines, especially for transversal flow machines, are known in a number of variants with respect to configuration and/or assembly, for example, from the following documents:

1. DE 92 00 116 U1
2. EP 0 642 204 A1

The rotor of a transversal flow machine then comprises one or more axially adjacent, concentric rings (active rings) separated from each other by rings made of plastic or another electrically nonconducting material lying in between and/or a rotor disk, in which so-called collector and soft iron elements, which can usually be made from axially layered magnetic steel sheet, and magnets are arranged in alternation on the periphery. These concentric rings are also referred to as the pole structure.

The rotor design described in DE 92 00 116 U1 has collector and soft iron elements that are provided on their sides facing the magnet arrangements with U-shaped recesses in the peripheral direction, into which the magnets are inserted. Two protrusions are formed by these recesses, which partially enclose the magnet arrangement. The width of the recess or its dimension in the radial direction is then slightly greater than the surface length l, i.e., the dimension of the magnetic arrangement in the radial direction. A shape-mated anchoring between each magnet arrangement and the two adjacent collector and soft iron elements is achieved by this expedient. However, a glue joint between the magnet arrangement and the collector and soft iron elements is preferably also retained. To avoid a conducting connection between the collector and soft iron elements and the magnet, which leads to severe heating of the rotor and can also adversely affect the magnetic properties of the magnet arrangement, an insulation layer is provided in the region of the U-shaped recesses on the contact surfaces between the collector and the soft iron element and the magnet arrangement.

To achieve small rotor arrangements in which a small pole division is desired, EP 0 642 204 A1 discloses a variant in which the rotor has a rotor disk that can be fastened to the rotor axis in the axial direction, on which the polarized magnets and the magnetizable collector and soft iron elements are attached in a concentric ring arrangement, in which attachment occurs with fastening elements that pass through the polarized magnets, which are designed in two parts, at least in the arrangement region of the fastening element, and are attached to the rotor disk or to an insulation element connected to the rotor disk in the axial direction. Here again the magnet arrangements are connected in shape-mated fashion and/or bonded to the adjacent collector and soft iron elements in the peripheral direction. A shortcoming of the use of these elements which additionally secure against peel stress, is mostly the fact that these require a significant increase in rotor weight and rotor volume and thus an increase in active volume subject to loss. The holes for the threaded inserts and screw holes to be provided for assembly of the securing elements require high manufacturing and machining costs. When the securing or fastening elements are arranged through the active rings, either the magnets must be provided in divided form, i.e., in double numbers, or when such elements are made or arranged in the region of the collector and soft iron elements, these are subject to high machining and assembly costs. In a rotor corresponding to the variant described in EP 0 642 204 A1, the centrifugal forces that occur at high speeds can no longer be economically managed by joining with external force and bonding (especially screwing and gluing).

A shortcoming of such arrangements consists of the fact that, when only shape-mated connections are provided between the magnets of the magnet arrangement and the adjacent collector and soft iron elements in the peripheral direction, the magnet arrangements are forced against the radially outer protrusions owing to the centrifugal forces occurring during operation of the rotor even with simultaneous position fixation in the radial direction of the collector and soft iron elements relative to the adjacent elements in the axial direction, like the end ring, intermediate ring and support disk, and make possible an electrically conducting connection between the collector and soft iron elements and the magnet arrangement, which can lead to undesired high heating of the rotor. The magnets are also loaded by heat conduction and their magnetic properties are adversely affected, which can lead to complete demagnetization of the magnets. In variants with an insulation layer provided on the collector and soft iron elements, there is a hazard that the insulation layer in this region is damaged on the collector and soft iron element and a conducting connection is produced between the collector and soft iron element and magnet arrangement owing to the centrifugal forces that act on the magnet arrangements and force the magnet arrangements in the radial direction against the protrusions on the collector and soft iron element that form a stop in the radial direction and are arranged in the region of the outside diameter of the collector and soft iron element, which leads to the already mentioned shortcomings.

The underlying task of the invention is therefore to further modify a rotor of an electric machine so that the mentioned shortcomings are avoided. In particular, the additional losses that result in severe heating of the rotor and adversely affect the magnetic properties of the magnets during failure of the insulation layer are to be avoided with retained rotor strength in rotors of the type mentioned at the outset with shape-mated connection between the collector and soft iron elements and the magnet arrangement. The design and manufacturing costs are to be kept as low as possible.

SUMMARY OF THE INVENTION

According to the invention at least one collector and soft iron element directly adjacent to the magnet arrangement on both sides is free of an outer stop surface that is at least indirectly effective for the magnetic arrangement in the radial direction. For shape mating this means that only a first collector and soft iron element adjacent to a magnet arrangement in the peripheral direction at least indirectly forms a stop surface in the radial direction for the magnets of the magnet arrangement and thus the possibility of shape-mated anchoring of the magnet arrangement with the collector and soft iron element. The stop surface is designed, for example, in the form of a protrusion arranged on the face of the first collector and soft iron element facing the magnet in the peripheral direction. The stop surface or the protrusion forming the stop surface is preferably arranged in the region of the outside diameter of the first collector and soft iron element in the radial direction on a specific diameter and extends essentially in the peripheral direction over part of the magnet arrangement or encloses it. The second collector and soft iron element adjacent to the magnet arrangement on its opposite face in the peripheral direction is free of such an outer stop surface for the magnet arrangement in the radial direction at least in the region of its face facing the magnet arrangement. In this case the second collector and soft iron element adjacent to a magnet arrangement can be entirely free of a protrusion in the region of the outside diameter of the magnet arrangement. However, it is also conceivable to provide a protrusion for the purpose of precentering, whose surface facing the rotor axis, however, is arranged on a diameter that is greater than the first specified diameter for arrangement of the stop surface on the first collector and soft iron element adjacent to the magnet arrangement. In this case either 1) a specified spacing $a_1$ is provided between the outside diameter of the magnetic arrangement and the protrusion on the collector and soft iron element or
2) in magnet arrangements with different dimensions in the peripheral direction over their extent in the radial direction, for example, in magnet arrangements with larger dimensions in the peripheral direction in the region of the center part of the magnet arrangement in the radial direction, a specified spacing $a_2$ is provided between the radially outermost part extending farthest in the peripheral direction of the outside surface of the magnet arrangement and the corresponding protrusions on the collector and soft iron element.

A support of the magnet arrangement under the influence of centrifugal force on this protrusion that essentially serves for precentering is therefore reliably avoided so that the insulation layer provided on the collector and soft iron element is also kept free of damage in this region. The hazard of creation of a conducting connection between two collector and soft iron elements separated from each other by a magnet arrangement can therefore be almost fully ruled out, since damage to the insulation layer applied to the collector of soft iron elements from high mechanical stress, for example, when the magnet arrangements are supported via this insulation layer on the stop surface, which can lead to damage and thus creation of a conducting connection, remains essentially limited to this region and the stop surfaces of the magnet arrangements in the peripheral direction on the adjacent collector and soft iron element are not exposed to this enormously high stress so that damage to the insulation layer provided between the magnet arrangement and the collector and soft iron element is essentially ruled out in this region.

A situation is achieved with the solution according to the invention in which the forces preferably acting uniformly on a magnet arrangement or the individual magnets of a magnet arrangement in the radial direction are only supported on one of the two collector and soft iron elements adjacent to the magnet arrangement, especially on the stop surface on this collector and soft iron element provided for this purpose. The inventor has recognized that, owing to centrifugal force in the solutions known from the prior art, the magnet arrangements are forced in the radial direction against the protrusions formed essentially in the peripheral direction, each of which encloses part of the magnet arrangement in the peripheral direction and forms a stop for the magnet arrangement for the radial direction, on the collector and soft iron elements directly adjacent to the magnet arrangements in the region of their outside diameter. In this case, because of the high stresses, the insulation layer on a number of connections between magnet arrangements and collector and soft iron elements are damaged over the periphery of the rotor so that a conducting connection is produced between the magnet arrangement and collector, which can be a cause for excessively strong heating of the rotor. Owing to the number of damaged sites of the insulation layer in the peripheral direction, a continuous conducting connection is sometimes produced in the peripheral direction over the entire rotor. This is prevented in a simple manner by the solution according to the invention, the forces in the radial direction only being supported on a collector and soft iron element adjacent to a magnet arrangement. In this case even damage to the insulation layer does not lead to an adverse effect on the rotor and especially the properties of the magnets, since continuous connections in the peripheral direction are necessary for thermal damage from electric currents. The stop surfaces that take up the forces on the collector and soft element edge opposite the collector and soft elements, whether on the same collector and soft iron element or on the next collector and soft iron element adjacent to the magnet arrangement, represent a reliable barrier for these currents. Complete shape mating with the adjacent collector and soft iron element is therefore only possible on one side of the magnet arrangement.

The solution according to the invention does not require that the second of the collector and soft iron elements adjacent to the magnet arrangement must be entirely free of a protrusion in the region of its outside diameter. A protrusion for precentering is conceivable, but this is to be arranged on a diameter on which the surface of the protrusion facing in the direction of the rotor axis is not active as a stop surface in normal operation of the electric machine, especially the transversal flow machine.

The individual collector and soft iron elements are preferably made from axially layered sheet elements. The protrusions are preferably formed by U-shaped recesses.

The collector and soft iron elements are preferably designed nonsymmetric with reference to a line of symmetry running in the radial direction of the incorporation position. This means that each collector and soft iron element has a stop surface to implement an outer stop on at least one of its faces facing the magnet arrangements in the peripheral direction, whereas the other opposite face surface is free of such an effective stop. This freedom from an effective stop can be implemented through 1) recesses of larger dimension or
2) omission of an outer protrusion, relative to the face forming the stop.

The collector and soft iron elements are preferably arranged in the peripheral direction so that their identically designed faces are identically aligned in the peripheral direction, i.e., point in the same direction of rotation. This offers the advantage that only one collector and soft iron element type need be used to produce a rotor and simple assembly can be guaranteed.

Alignment of the faces with the stop surfaces can occur in the peripheral direction either against the direction of rotation or in the direction of rotation. Alignment preferably always occurs in one direction.

However, these is also the possibility of providing at least two different collector and soft iron element types (a first collector and soft iron element type and a second collector and soft iron element type) in the rotor, which are arranged in alternation in the peripheral direction between the magnet arrangements. Each collector and soft iron element of the first type forms a radially outer stop surface to support the magnet arrangement in the radial direction in the region of its two faces directed toward the adjacent magnet arrangements in the peripheral direction, whereas each collector and soft iron element of the second type is free of a radially outer stop surface to support the magnet arrangement in the region of its two faces directed toward the adjacent magnet arrangements in the peripheral direction. Each of the collector and soft iron elements is preferably designed for this purpose symmetrical with reference to a line of symmetry running in the radial direction in the incorporation position. Thermal damage can also be avoided with this solution, since a conducting connection cannot be produced via a number of magnet arrangements and collector and soft iron elements in the peripheral direction, owing to the blocking effect of the missing stop surfaces on the collector and soft iron elements.

The magnet arrangements can be designed in one piece or can each enclose at least one inner and one outer magnet. In the last-named case at least two magnets are arranged in succession in the radial direction. In the magnets arranged in succession in the radial direction the inner magnet lying inward in the radial direction has smaller dimensions in the radial direction and preferably also in the peripheral direction than the outer magnet. Other variants are conceivable.

The individual magnets of the magnet arrangement can be designed differently in the radial direction with respect to their cross section, i.e., the use of rectangular or trapezoidal cross sections is possible.

There is the additional possibility of allocating at least one connection element to a number of magnet arrangements, which serves for at least shape-mated connection between the individual rows of alternately arranged collector and soft iron elements with the magnet arrangements lying in-between in the axial direction, i.e., with the rows of directly adjacent rings, for example, end ring, intermediate ring and/or support disk. Arrangement of the connection elements with one-part design of the magnet can occur above and/or beneath the magnets in the radial direction. In the variants of a magnetic arrangement with at least two magnets (an inner and outer magnet) this connection element is preferably arranged between the inner and outer magnets, since this type of arrangement guarantees fixation of the individual magnets (inner and outer magnet) in the radial direction. For this purpose, protruding elements are allocated on both sides in the peripheral direction at specified spacings in the axial direction to the rows of alternately magnetized magnet arrangements in the peripheral direction with the collector and soft iron elements arranged in between. The protruding element can be inserted into complementary grooves on the rings (end ring, intermediate ring and central support disk) adjacent to the separate rows of alternately magnetized magnet arrangements in the peripheral direction with collector and soft iron elements lying in between.

These connection elements with the protruding elements on both sides are preferably designed in the form of an intermediate plate made from a nonmagnetic material. Application DE 196 10 754 is referred to with reference to the specific design, whose disclosure contents are fully included in the disclosure content of this application. These connection elements, especially intermediate plates, can additionally form a conducting connection between two collector and soft iron elements adjacent to a magnet arrangement.

These intermediate elements can preferably be allocated in the peripheral direction at uniform and specified spacing either to each magnet arrangement or a number but not all of the magnet arrangements.

To reduce the possible surfaces for achievement of a conducting connection between the individual collector and soft iron elements and the magnet arrangements, the magnet arrangements are preferably designed so that, especially in variants with at least one inner and one outer magnet, the face surfaces of the magnet arrangement directed toward the faces free of stops have no protrusions or recesses that would form additional stop surfaces for the collector and soft iron elements. This also applies by analogy for the embodiment and arrangement or the intermediate plate of a shape-mated connection element. This always extends in the peripheral direction only maximally corresponding to the extent of the magnet arrangement in the peripheral direction.

The radially outer stop surface for the magnet arrangement is preferably arranged in the region of the outside diameter of the magnetic arrangements, since in this case the entire magnet arrangement can be integrated in the shape-mated connection. Arrangements of the radially outer stop surface in the region of the face surfaces of the collector and soft iron elements in the radial direction, i.e., the radially outer stop surface for the magnet arrangement is arranged on a diameter greater than the inside diameter of the magnet arrangement and in the region of extent of the magnet arrangement in the radial direction, are also conceivable but in this case part of the magnet arrangement is excluded from the shape-mated connection.

In the simplest case the recesses provided to achieve shape-mated connection between the collector and soft iron element and magnet arrangement are designed U-shaped on the collector and soft iron element. The two arms then form the protrusion.

The changes are preferably made to achieve one-sided force take-up on the collector and soft iron element. However, it is also theoretically conceivable to create the prerequisites by corresponding configuration of the magnets, but this is very costly in terms of manufacture and increased eddy current losses will be expected.

The solution according to the invention is useable for different variants of rotors. The rotors, including a central support disk with at least one pole structure arranged coaxial to the rotor axis are then designed so that 1) at least one annular pole structure extending on one face of the support disk in the axial direction away from the central support disk or 2) one pole structure on both sides of the faces of the support disk in provided.

The individual pole structures comprise at least two adjacent rows of alternately magnetized magnet arrangements in the peripheral direction with collector and soft iron element lying in between, separated by an intermediate layer of magnetically and electrically nonconducting material, which is also referred to as intermediate ring.

The rotors configured according to the invention are useable for any type of electric machines, especially transversal flow machines.

BRIEF DESCRIPTION OF THE DRAWINGS

The configuration of a rotor of an electric machine according to the invention, especially a transversal flow machine is explained below with reference to the figures. The following are presented in particular.

DETAILED DESCRIPTION OF THE PREFERRED EMBODIMENTS

Figure 1A:
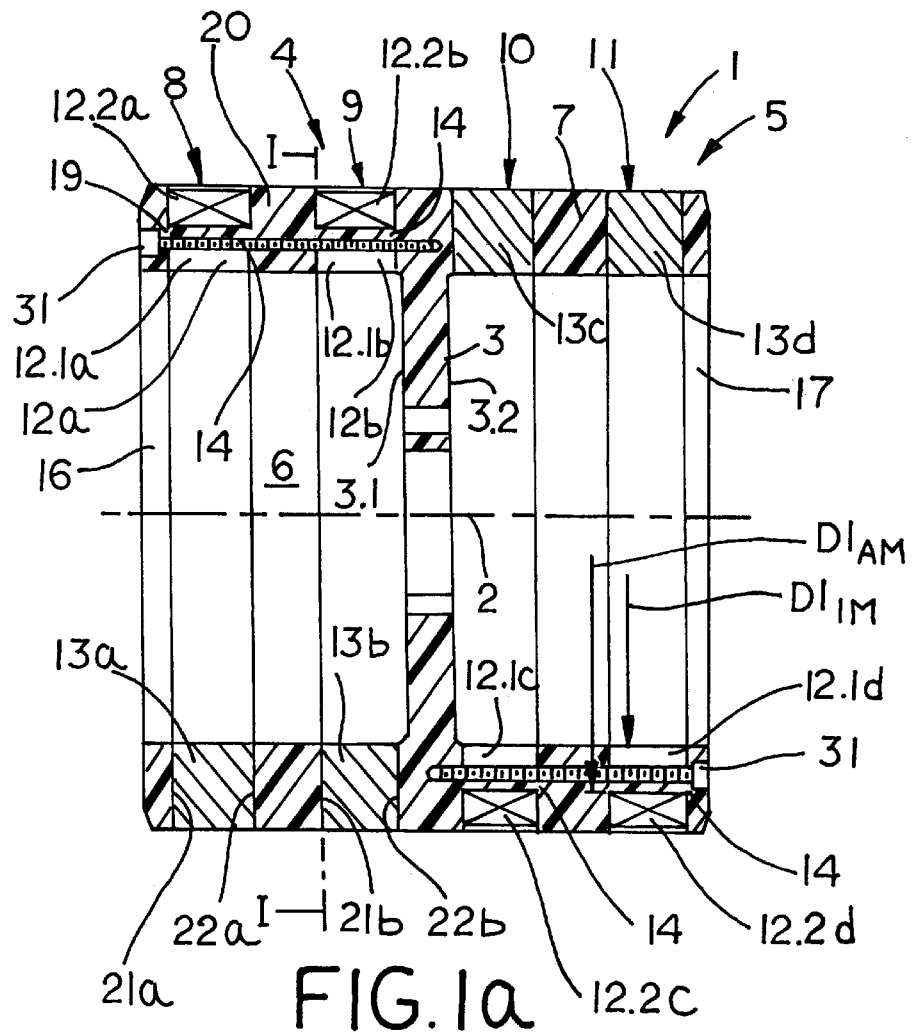
FIGS. 1a and 1b explain a variant of a rotor according to the invention with magnet arrangements, including an inner and an outer magnet.

FIG. 1a shows an axial section through a rotor 1 in simplified fashion to explain the basic design of the rotor configured according to the invention. This includes a rotor shaft mounted in a housing (not shown here in particular), whose geometric axis 2 coincides with the axis of symmetry or rotation of rotor 1. Rotor 1 also includes a support disk 3 arranged to rotate in unison on the rotor shaft, on whose faces 3.1 and 3.2 an annular pole structure 4 and 5 coaxial to rotor axis 2 is arranged. Each pole structure 4 and 5 comprises two adjacent rows 8, 9, and 10, 11 of alternately magnetized permanent magnet arrangements 12 in the peripheral direction separated by an intermediate layer 6 and 7 made of magnetically and electrically nonconducting material, here designated 12a and 12b for rows 8 and 9, collector and soft iron elements 13 lying in between, here designated 13a, 13b, 13c and 13d for rows 8, 9, 10 and 11. The collector and soft iron elements 13 are preferably made from a number of sheet elements arranged one behind the other, which are preferably kept in shape by means of a casting mass, which simultaneously forms an insulation layer on the collector elements. It is also conceivable to join the individual sheet elements together by bonding.

An end ring 16 and 17 is allocated on the face to each pole structure 4 and 5. Each magnet arrangement 12 includes essentially two magnets—an inner magnet 12.1 and an outer magnet 12.2, here represented by 12.1a, 12.2a, 12.3a, 12.4a and 12.1b, 12.2b, 12.3b, 12.4b.

Figure 1B:
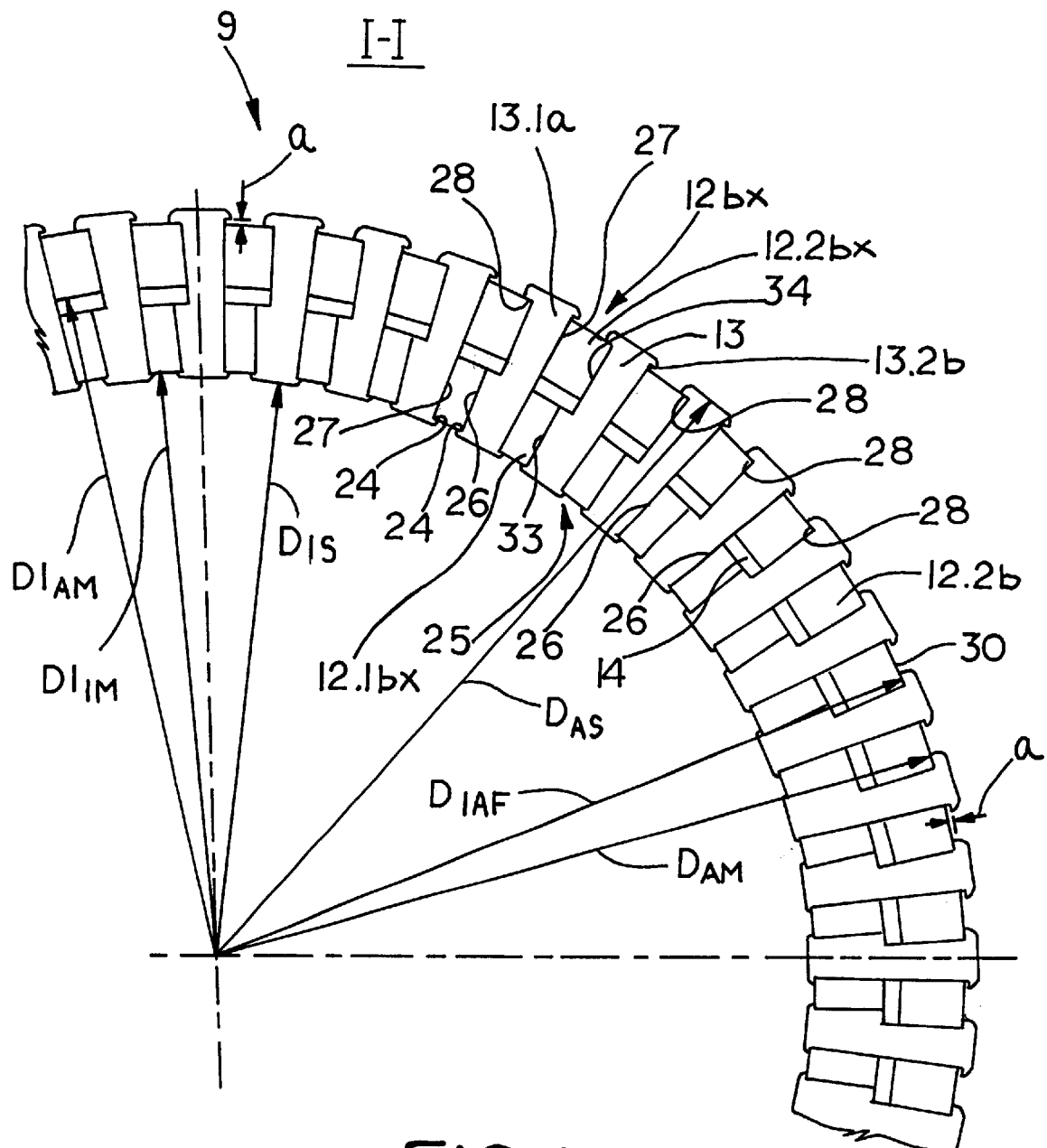

The inner magnet 12.1 is then arranged in the radial direction referred to the rotor axis 2 on a smaller diameter $DI_{IM}$ than the outer magnet 12.2 of each magnet arrangement 12. Attachment of the magnets 12.1 and 12.2 in the peripheral direction essentially occurs by shape-mating with the collector and soft iron elements 13 adjacent to magnet arrangements 12 in the peripheral direction, as shown in FIG. 1b. The use of a casting or bonding mass, for example, in the form of glue, is additionally conceivable.

A shape-mated connection element 14 is allocated to each magnet arrangement 12. The shape-mated connection element 14 is preferably designed as a plate stamped from nonmagnetic sheet. This preferably extends in the axial direction beyond the axial extent of magnet arrangement 12. Complementary grooves 21 and 22 in the elements adjacent to rings 8, 9, 10, and 11 are allocated to the protrusions 19 or 20 so formed. The connection elements 14 extend in the peripheral direction essentially over the extent of magnets 12.1 and 12.2 in the peripheral direction. The connection elements 14 are inserted in each magnet arrangement 12 between the inner and outer magnets 12.1 or 12.2 in the complementary grooves 21 and 22 on the elements adjacent to magnet arrangement 12 in the axial direction, here the grooves 21 a on end ring 16 and 22a on intermediate ring 6 and 21b on intermediate ring 6 and 22b on support disk 3. Under the influence of centrifugal force shape-mating is therefore produced between the individual collector and soft iron elements 13 and the magnets 12.1 and 12.2 in the radial direction, since the shape-mated connection element 14 fixed the position of magnets 12.1 and 12.2 of magnet arrangements 12 in the radial direction and the magnet arrangements 12 with the collector and soft iron elements 13 have a shape-mated connection in the peripheral direction and are limited in the radial direction in their movement path. Additional connection elements by external force can also be provided, for example, in the form of screw connections 31, which tighten the pole structures 4 and 5 to the support disk 3.

FIG. 1b shows in a simplified depiction a view I—I corresponding to FIG. 1a, i.e., a view of the face of the pole structure 4 running in the peripheral direction, in particular, a view of row 9. Each of the collector and soft iron elements 13 adjacent to the magnet arrangements 12 has a first radially inward lying stop 24 in the radial direction referred to rotor axis 2. These inward lying stops 24 are formed by a protrusion 25, which is arranged in the region of the inside diameter $D_{IS}$ of a collector and soft iron element 13 on its faces 26 and 27 facing away from each other in the peripheral direction.

It is prescribed according the invention that only one outward lying stop surface be formed in the radial direction for a magnet arrangement 12. This outward lying stop and the stop surface is denoted 28 and in the depicted case is arranged in the region of the outside diameter $D_{AS}$ of the collector and soft iron element 13 on a face 26 so that during rotation of rotor 1 the outer magnet, here represented by 12.2bx is supported under the influence of centrifugal force with its outer face 30 on stop 28. The outside diameter $D_{AM}$ of magnet arrangement 12b and the outer magnets 12.2b, then corresponds to diameter $D_{IAF}$ of the stop or stop surface 28. At least one of the two collector and soft iron elements 13.1b or 13.2b directly adjacent to a magnet arrangement 12bx in the peripheral direction, here 13.1b, is free of a second outer stop at least on the face 27 facing the magnet arrangement 12 in the region of the outside diameter $D_{AM}$ of the magnet arrangement 12bx. In the depicted case, this freedom is formed by the implementation of a specified minimum spacing a between the outside diameter $D_{AM}$ of magnet arrangement 12bx and a protrusion 32. The minimum spacing a should always be chosen so that support of the magnetic arrangement 12bx, especially individual magnets 12b.1 and 12b.2 in the radial direction on one of the two adjacent collector and soft iron elements is avoided. However, a design of the collector and soft iron element 13b free of an outer protrusion 32 in the region of end 27 is also conceivable.

In the variant depicted in FIG. 1b the second collector and soft iron element 13.1b adjacent to the magnet arrangement 12bx also has the protrusion 32 in the region of its face 27, but this protrusion merely serves for precentering of the magnet arrangements.

The individual collector and soft iron elements 13b are designed nonsymmetric to implement the function. In this preferred variant with nonsymmetrically designed collector and soft iron elements 13b, the collector and soft iron elements are always arranged in the peripheral direction so that the faces 26 and 27 designed in the same manner are always aligned in the same direction in the peripheral direction.

Preferably, it is also prescribed that the number of stop surfaces and thus the possible threatened sites of an insulation layer interruption be minimized in the radial direction for magnets 12.1b and 12.2b, as well as intermediate plate 14. For this reason, no additional stop surface beyond the radially inner stop 24 is provided in the radial direction for the intermediate plate or the individual magnets on the stop-free collector and soft iron element adjacent to magnet arrangement 12bx, here 13.b1. The entire magnet arrangement 12bx with intermediate plate 14 lies against a surface, whereas on the opposite collector and soft iron element 13.2b, the face 26 forms at least two partial stop surfaces 33 and 34.

In a variant according to FIG. 1b shape-mating between the magnet arrangement 12bx and the collector and soft iron elements primarily occurs with the collector and soft iron element 13.2b.

Figure 2:
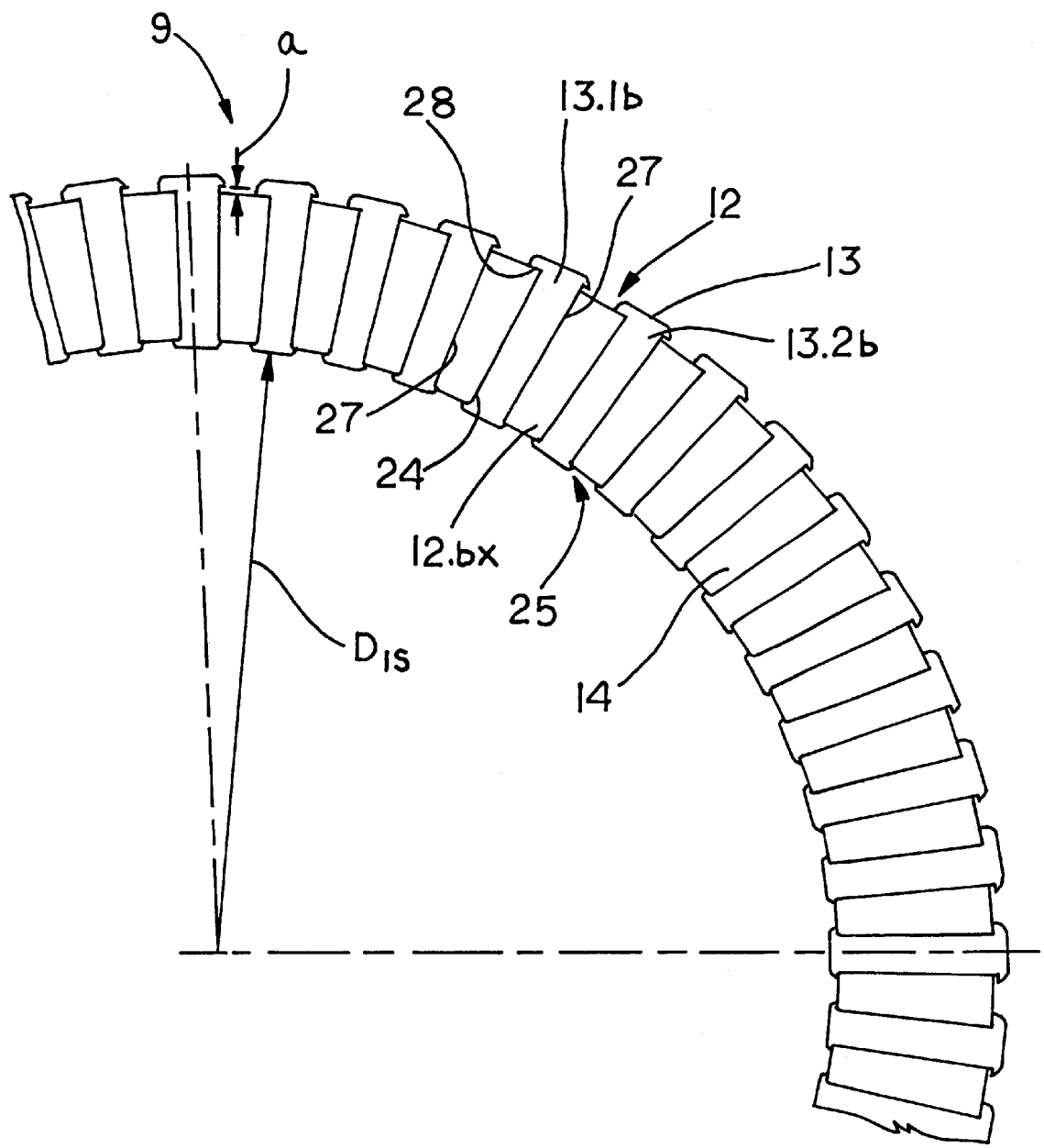
FIG. 2 shows a variant according to the invention of a rotor with magnet arrangement designed in one piece.

FIG. 2 shows a variant according to the invention for a one-sided force take-up in a view of a pole structure as described in FIG. 1b for a rotor variant with a one-part magnet arrangement 12b. The basic design corresponds to that described in FIG. 1. The same reference numbers are used for the same elements.

The two collector and soft iron elements 13.1b and 13.2b are arranged next to the magnet arrangement 12b, here 12bx. In this case, the collector and soft iron element 13.2b has a protrusion on its face directed toward magnet arrangement 12bx in the region of its outside diameter $D_{AS}$, which forms a stop 28 in the radial direction for the magnet arrangement 12bx. The collector and soft iron element 13.1b adjacent to the opposite side of the magnet arrangement is free of an outer stop in the radial direction on the face 27 facing the magnet arrangement in the region of its outside diameter $D_{AS}$. The protrusion 32 also provided here is arranged at a spacing A from outside diameter $D_{AM}$.

Here again the collector and soft iron elements 13 are designed nonsymmetric. The identically configured faces 26 and 27 are aligned the same in the peripheral direction.

Figure 3:
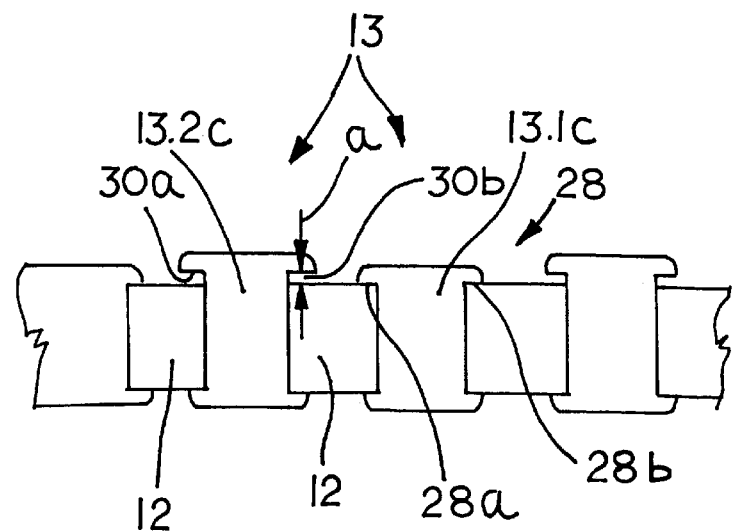
FIG. 3 shows a variant according to the invention of a rotor with symmetric collector and soft iron elements of two types.

However, as illustrated in FIG. 3, there is also the possibility of providing at least two different collector and soft iron element types 13 (a first collector and soft iron element type 13.1c and a second collector and soft iron element type 13.2c) in the rotor, which are arranged in alternation in the peripheral direction between the magnet arrangements 12. Each collector and soft iron element of the first type 13.1c forms a radially outer stop surface 28 to support the magnet arrangement 12 in the radial direction in the region of its two faces 28a and 28b directed toward the adjacent magnet arrangements 12 in the peripheral direction, whereas each collector and soft iron element of the second type 13.2c is free of a radially outer stop surface to support the magnet arrangement in the region of its two faces 30a and 30b directed toward the adjacent magnet arrangements 12 in the peripheral direction. Each of the collector and soft iron elements 13.1c and 13.2c is preferably designed for this purpose symmetrical with reference to a line of symmetry running in the radial direction in the incorporation position. Thermal damage can also be avoided with this solution, since a conducting connection cannot be produced via a number of magnet arrangements 12 and collector and soft iron elements 13 in the peripheral direction, owing to the blocking effect of the missing stop surfaces on the collector and soft iron elements of the second type 13.2c radial direction on the face 27 facing the magnet arrangement in the region of its outside diameter $D_{AS}$. The protrusion 32 also provided here is arranged at a spacing A from outside diameter $D_{AM}$.

Here again the collector and soft iron elements 13 are designed nonsymmetric. The identically configured faces 26 and 27 are aligned the same in the peripheral direction.

What is claimed is:

1. Rotor for an electric machine, especially a transversal flow machine
    with at least one pole structure,
    the pole structure comprises two adjacent rows of magnet arrangements alternately magnetized in the peripheral direction with collector and soft iron elements lying in between, separated by an intermediate layer of magnetically and electrically nonconducting material;
    the magnet arrangements are connected in shape-mated fashion in the peripheral direction to the adjacent collector and soft iron elements;
    the collector and soft iron elements are at least partially provided with an insulation layer;
    each collector and soft iron element includes a radial extension which extends radially beyond a radial end surface of each of the magnet arrangements;
    at least one of collector and soft iron elements adjacent to a magnet arrangement in the peripheral direction includes a radially outward stop surface for at least indirect support of the magnet arrangement in the radial direction;
    and wherein at least one of the collector and soft iron elements adjacent to the magnet arrangement in the peripheral direction is free of a radially outward stop surface for at least indirect support of the magnet arrangement in the radial direction.

2. Rotor according to claim 1, wherein each collector and soft iron element is designed nonsymmetric with reference to a line of symmetry running in the radial direction in the incorporation position.

3. Rotor according to claim 2, wherein the collector and soft iron elements are arranged in the peripheral direction so that their identically designed faces are aligned in the same direction in the peripheral direction.

4. Rotor according to claim 1, wherein
    each of the collector and soft iron elements is designed symmetrically with reference to a line of symmetry running in the radial direction;
    at least two different collector and soft iron elements are provided—a first collector and soft iron element type and a second collector and soft iron element type, which are arranged alternately in the peripheral direction between the magnet arrangements;
    each first collector and soft iron element type forms a radially outward stop surface to support the magnet arrangement in the radial direction in the region of its two faces directed toward the adjacent magnet arrangements in the radial direction; and
    each second collector and soft iron element is free of a radially outward stop surface to support the magnet arrangement in the region of its two faces directed toward the adjacent magnet arrangements in the peripheral directions.

5. Rotor according to claim 1, wherein each of the magnet arrangements is designed in one part.

6. Rotor according to claim 1, wherein a number of magnet arrangements comprise at least one inner magnet and one outer magnet.

7. Rotor according to claim 6, wherein each magnet arrangement has an inner and outer magnet.

8. Rotor according to claim 1, wherein
    protruding elements on both sides in the axial direction at specified spacing are allocated to the rows of alternately magnetized magnet arrangements in the peripheral direction with collector and soft iron elements lying in between in the peripheral direction; and
    the protruding elements are insertable into complementary grooves on rings adjacent to the separate rows of alternately magnetized magnet arrangements with collector and soft iron elements lying in between in the peripheral direction.

9. Rotor according to claim 8, wherein the rings are made from a nonmagnetic material.

10. Rotor according to claim 8, wherein
    the protruding elements are allocated to a number of magnet arrangements;
    a number of magnet arrangements have an inner and outer magnet; and the rings are arranged between the inner and outer magnets in the radial direction and extend beyond their extent in the axial direction.

11. Rotor according to claim 1, wherein the radially outer stop surface for the magnet arrangement is arranged in the region of the outside diameter of the magnet arrangements.

12. Rotor according to claim 1, wherein the radially outer stop surface for the magnet arrangement is arranged on a diameter greater than the inside diameter of the magnetic arrangement and in the region of extent of the magnetic arrangement in the radial direction.

13. Rotor according to claim 1, wherein
at least one U-shaped recess is provided on the collector and soft iron elements to achieve shape mating with the magnet arrangements on their faces facing the magnetic arrangements in the peripheral direction;

each U-shaped recess forms two protrusions that extend in the peripheral direction over part of the adjacent magnet arrangement; and a spacing a is provided between a radially outer protrusion of a U-shaped recess of a collector and soft iron element adjacent to a magnet arrangement and the radially outer surface of the magnet arrangement in this region in the radial direction.

14. Rotor for an electric machine, especially a transversal flow machine
with at least one pole structure,
the pole structure comprises two adjacent rows of magnet arrangements alternately magnetized in the peripheral direction with collector and soft iron elements lying in between, separated by an intermediate layer of magnetically and electrically nonconducting material;

the magnet arrangements are connected in shape-mated fashion in the peripheral direction to the adjacent collector and soft iron elements;

the collector and soft iron elements are at least partially provided with an insulation layer;

at least one U-shaped recess is provided on the collector and soft iron elements to achieve shape mating with the magnet arrangements on their faces facing the magnetic arrangements in the peripheral direction;

each U-shaped recess forms two protrusions that extend in the peripheral direction over part of the adjacent magnet arrangement; and a spacing "a" is provided between a radially outer protrusion of a U-shaped recess of a collector and soft iron element adjacent to a magnet arrangement and the radially outer surface of the magnet arrangement in this region in the radial direction;

and wherein at least one of the collector and soft iron elements adjacent to a magnet arrangement in the peripheral direction is free of a radially outward stop surface for at least indirect support of the magnet arrangement in the radial direction.

* * * * *

UNITED STATES PATENT AND TRADEMARK OFFICE
CERTIFICATE OF CORRECTION

PATENT NO.    : 6,288,467 B1
DATED         : September 11, 2001
INVENTOR(S)   : Lange et al.

It is certified that error appears in the above-identified patent and that said Letters Patent is hereby corrected as shown below:

Column 9,
Lines 46-53, beginning with the word "radical", please delete the following text:
"radical direction on the face 27 facing the magnet arrangement in the region of its outside diameter $D_{AS}$. The protrusion 32 also provided here is arranged at a spacing A from outside diameter $D_{AM}$.

Here again the collector and soft iron elements 13 are designed nonsymmetric. The identically configured faces 26 and 27 are aligned the same in the peripheral direction."

Signed and Sealed this

Twenty-third Day of July, 2002

Attest:

Attesting Officer

JAMES E. ROGAN
*Director of the United States Patent and Trademark Office*